United States Patent
Saito

(10) Patent No.: US 11,263,555 B2
(45) Date of Patent: Mar. 1, 2022

(54) GENERATING EXPLANATIONS OF MACHINE LEARNING PREDICTIONS IN MATCHING PROBLEMS

(71) Applicant: SAP SE, Walldorf (DE)

(72) Inventor: Sean Saito, Singapore (SG)

(73) Assignee: SAP SE, Walldorf (DE)

( * ) Notice: Subject to any disclaimer, the term of this patent is extended or adjusted under 35 U.S.C. 154(b) by 536 days.

(21) Appl. No.: 16/403,801

(22) Filed: May 6, 2019

(65) Prior Publication Data

US 2020/0356891 A1 Nov. 12, 2020

(51) Int. Cl.
*G06N 20/00* (2019.01)
*G06F 40/40* (2020.01)

(52) U.S. Cl.
CPC ............. *G06N 20/00* (2019.01); *G06F 40/40* (2020.01)

(58) Field of Classification Search
CPC ......... G06N 20/00; G06N 5/045; G06F 40/40
See application file for complete search history.

(56) References Cited

U.S. PATENT DOCUMENTS

2020/0365262 A1* 11/2020 Sreenivasan .......... G16H 30/00

OTHER PUBLICATIONS

U.S. Appl. No. 16/186,784, filed Nov. 12, 2018, Saito et al.
U.S. Appl. No. 16/208,681, filed Dec. 4, 2018, Saito et al.
U.S. Appl. No. 16/210,070, filed Dec. 5, 2018, Le et al.
U.S. Appl. No. 16/217,148, filed Dec. 12, 2018, Saito et al.
U.S. Appl. No. 16/352,981, filed Mar. 14, 2019, Saito.

* cited by examiner

*Primary Examiner* — Soe Hlaing
(74) *Attorney, Agent, or Firm* — Fish & Richardson P.C.

(57) ABSTRACT

Methods, systems, and computer-readable storage media for receiving a set of documents matched by a ML model, each document in the set of documents including a computer-readable electronic document, processing a set of pairwise features, the ML model, and the set of documents by an explanation framework to generate a set of raw explanations, the set of raw explanations including one or more raw explanations, each raw explanation including a pairwise feature and an importance score, for each raw explanation, identifying a natural language template based on the pairwise feature and the importance score, and populating the natural language template with one or more parameters provided from the set of documents to provide a natural language explanation for matching of the documents in the set of documents by the ML model.

20 Claims, 8 Drawing Sheets

| Bank Statement Field | Operator | Invoice Field |
|---|---|---|
| Amount | DIFF | Amount |
| Memoline | CONTAINS | Reference Number |
| Memoline | EDITDISTANCE | Reference Number |
| Memoline | CONTAINS | Customer ID |
| Memoline | EDITDISTANCE | Customer Name |
| Currency | EQUALS | Currency |
| Posting Date | DATEDIFF | Posting Date |

FIG. 3A

| Operator | Description |
|---|---|
| DIFF | The numerical difference between values of fields A and B. |
| DIFFRAC | The fractional difference between values of fields A and B. |
| CONTAINS | Whether the value of field A is contained in the value of field B. |
| EDITDISTANCE | The string similarity between the values of fields A and B. |
| EQUALS | Whether the value of field A equals the value of field B. |
| DATEDIFF | The number of days between values of fields A and B. |

FIG. 3B

Bank Statement — 400

| AMT_BS | MEMOLINE | CURR_BS |
|---|---|---|
| 750.00 | For invoice 1234* | USD |

Invoice — 402

| AMT_IV | REFID | CURR_IV |
|---|---|---|
| 749.00 | 1234ABC | USD |

| Bank Statement Field | Operator | Invoice Field | Value |
|---|---|---|---|
| AMT_BS | DIFF | AMT_IV | 1.00 |
| MEMOLINE | CONTAINS | REFID | FALSE |
| CURR_BS | EQUALS | CURR_IV | TRUE |

| Bank Statement Field | Operator | Invoice Field | Value | Importance |
|---|---|---|---|---|
| AMT_BS | DIFF | AMT_IV | 1.00 | 0.56 |
| MEMOLINE | CONTAINS | REFID | FALSE | -0.10 |
| CURR_BS | EQUALS | CURR_IV | TRUE | 0.20 |

*FIG. 5B*

| Operator | Feature Code Template |
|---|---|
| DIFF | DIFF:{BS_COLUMN};{IV_COLUMN} |
| DIFFRAC | DIFFRAC:{BS_COLUMN};{IV_COLUMN} |
| CONTAINS | CONTAINS:{BS_COLUMN};{IV_COLUMN} |
| EDITDISTANCE | ED:{BS_COLUMN};{IV_COLUMN} |
| EQUALS | EQ:{BS_COLUMN};{IV_COLUMN} |
| DATEDIFF | DATEDIFF:{BS_COLUMN};{IV_COLUMN} |

FIG. 6A

| Bank Statement Field | Operator | Invoice Field | Feature Code |
|---|---|---|---|
| Amount | DIFF | Amount | DIFF:AMT_BS:AMT_IV |
| Memoline | CONTAINS | Reference Number | CONTAINS:MEMOLINE:REFID |
| Memoline | EDITDISTANCE | Reference Number | ED:MEMOLINE:REFID |
| Memoline | CONTAINS | Customer ID | CONTAINS:MEMOLINE:CUSTID |
| Memoline | EDITDISTANCE | Customer Name | ED:MEMOLINE:CUSTOMER |
| Currency | EQUALS | Currency | EQ:CURR_BS:CURR_IV |
| Posting Date | DATEDIFF | Posting Date | DATEDIFF:POSTINGDATE_BS: POSTINGDATE_IV |

FIG. 6B

GENERATING EXPLANATIONS OF MACHINE LEARNING PREDICTIONS IN MATCHING PROBLEMS

BACKGROUND

In general, machine learning includes training a machine learning (ML) model that receives input and provides some output. Machine learning can be used in a variety of problem spaces. An example problem space includes matching items of one entity to items of another entity. Examples include, without limitation, matching questions to answers, people to products, and bank statements to invoices. In such use cases, the end user typically consumes the predictions and outputs of the ML model to make further decisions or actions.

Establishing the reliability of the ML model is integral to gaining the trust of the end user and ensuring the success and usability of the ML model as a whole. Here, reliability refers to the ability of ML models to provide reasons for their predictions. In other words, a reliable ML model must be able to explain its behavior in a way that is intuitive and palpable to the end user. However, there are several barriers to establishing trust in ML applications. For example, conventional ML models are not designed to be able to explain their predictions. Further, ML models can rely on complex data representations and are themselves parameterized by layers of matrices. Consequently, ML models can be seen as black-boxes, from which relationships between input data and the subsequent output prediction is not readily discernable.

SUMMARY

Implementations of the present disclosure are directed to explaining predictions output by ML models. More particularly, implementations of the present disclosure are directed to processing input representations used to train ML models to provide raw explanations from an explanation framework, and providing output representations that are used to transform the raw explanations into natural language explanations.

In some implementations, actions include receiving a set of documents matched by a ML model, each document in the set of documents including a computer-readable electronic document, processing a set of pairwise features, the ML model, and the set of documents by an explanation framework to generate a set of raw explanations, the set of raw explanations including one or more raw explanations, each raw explanation including a pairwise feature and an importance score, for each raw explanation, identifying a natural language template based on the pairwise feature and the importance score, and populating the natural language template with one or more parameters provided from the set of documents to provide a natural language explanation for matching of the documents in the set of documents by the ML model. Other implementations of this aspect include corresponding systems, apparatus, and computer programs, configured to perform the actions of the methods, encoded on computer storage devices.

These and other implementations can each optionally include one or more of the following features: identifying a natural language template based on the pairwise feature and the importance score includes: determining a set of natural language templates based on the pairwise feature, and selecting the natural language template from the set of natural language templates based on the importance score; determining a set of natural language templates based on the pairwise feature includes identifying a feature code for the pairwise feature, and identifying the set of natural language templates based on the feature code; actions further include determining a feature descriptor for the set of documents, the feature descriptor including a set of pairwise features provided by processing features based on binary operators; each parameter includes a value determined from a document in the set of documents; the explanation framework randomly perturbates input to the ML model to affect predictions of the ML model and generate an importance score for each pairwise feature; and the set of documents include a bank statement and an invoice.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3A depicts an example table of pairwise features applied on pairs of documents in accordance with implementations of the present disclosure.

FIG. 3B depicts example binary operators for pairwise features and respective descriptions.

FIG. 4 depicts an example document matching.

FIGS. 5A and 5B depict example generation of pairwise features between documents and respective importance scores in accordance with implementations of the present disclosure.

FIG. 6A depicts example pairwise feature operators and respective feature code templates in accordance with implementations of the present disclosure.

FIG. 6B depicts example pairwise feature codes and respective feature codes in accordance with implementations of the present disclosure.

Like reference symbols in the various drawings indicate like elements.

DETAILED DESCRIPTION

Figure 1:
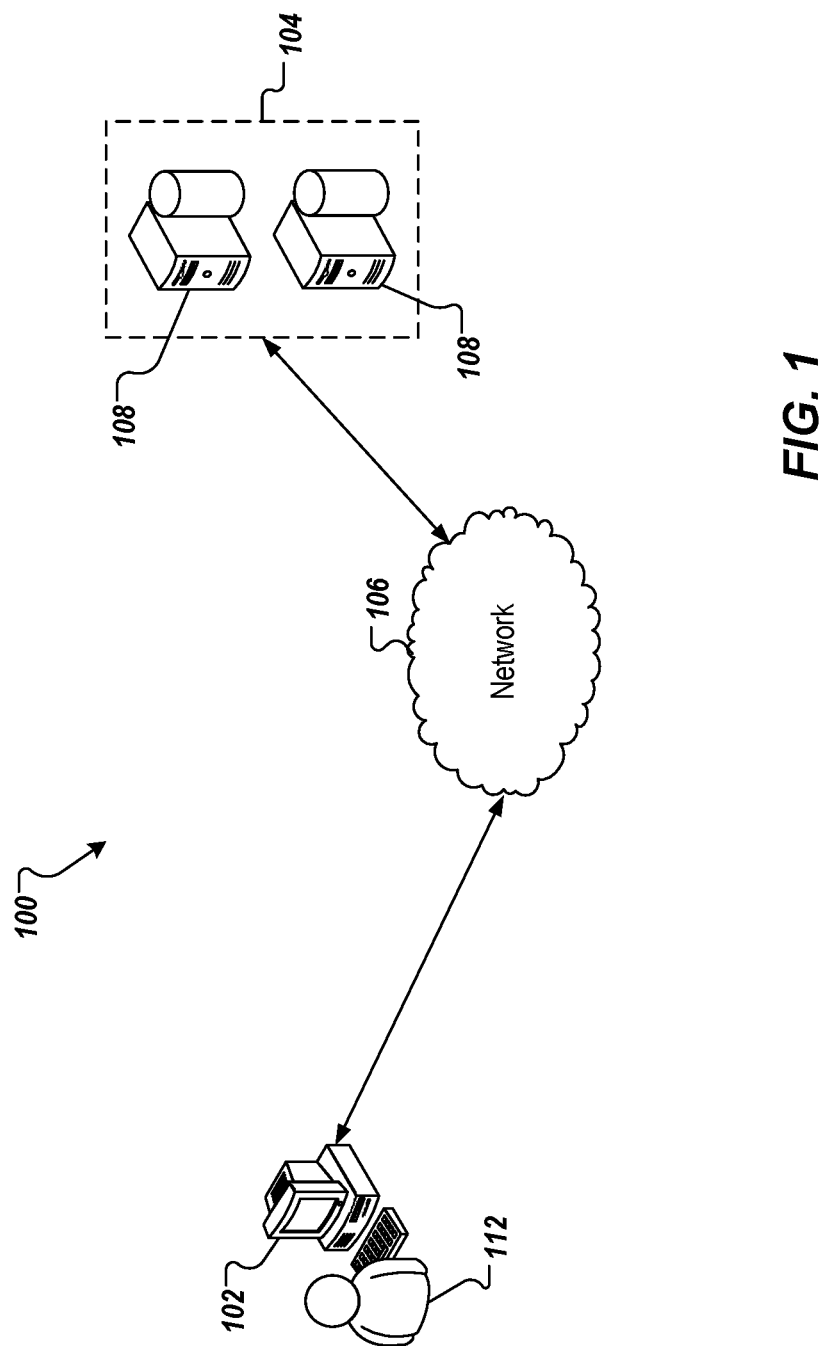
FIG. 1 depicts an example architecture that can be used to execute implementations of the present disclosure.

Implementations of the present disclosure are directed to explaining predictions output by ML models. More particularly, implementations of the present disclosure are directed to processing input representations used to train ML models to provide raw explanations from an explanation framework, and providing output representations that are used to transform the raw explanations into natural language explanations. Implementations can include actions of receiving a set of documents matched by a ML model, each document in the set of documents including a computer-readable electronic document, processing a set of pairwise features, the ML model, and the set of documents by an explanation framework to generate a set of raw explanations, the set of raw explanations including one or more raw explanations, each raw explanation including a pairwise feature and an importance score, for each raw explanation, identifying a natural language template based on the pairwise feature and the importance score, and populating the natural language template with one or more parameters provided from the set of documents to provide a natural language explanation for matching of the documents in the set of documents by the ML model.

To provide further context for implementations of the present disclosure, and as introduced above, machine learning can be used in a variety of problem spaces. An example problem space includes matching items of one entity to items of another entity. Examples include, without limitation, matching questions to answers, people to products, and bank statements to invoices. For example, electronic documents representing respective entities can be provided as input to a ML model, which matches electronic documents. In some examples, the ML model can output a match between electronic documents with a confidence score representing an accuracy of the predicted match. However, ML models can be viewed as block boxes, where input (e.g., electronic documents) is provided, and an output (e.g., match) is provided with little insight into the reasons underlying the ML model output.

In view of the above context, implementations of the present disclosure provide a platform for generating natural language explanations for predictions output by ML models. More particularly, implementations of the present disclosure are directed to processing input representations used to train ML models to provide raw explanations from an explanation framework, and providing output representations that are used to transform the raw explanations into natural language explanations.

Implementations of the present disclosure are described in further detail with reference to an example problem space that includes matching bank statements to invoices. More particularly, implementations of the present disclosure are described with reference to the problem of, given one bank statement (e.g., a computer-readable electronic document recording data representative of the bank statement), determining an invoice (e.g., a computer-readable electronic document recording data representative of the invoice) that the bank statement matches to. It is contemplated, however, that implementations of the present disclosure can be realized in any appropriate problem space.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a machine learning-based (ML-based) platform for matching of electronic documents and providing natural language explanations for matches. That is, the server system 104 can receive computer-readable electronic documents (e.g., bank statements, invoices), and can match electronic documents (e.g., bank statements to invoices). Further, the server system 104 can host an explanation platform that provides natural language explanations (e.g., user-friendly, human-readable explanations) of matching of electronic documents by a ML model. That is, and as described in further detail herein, the explanation framework of the present disclosure processes input representations used to train the ML model to provide raw explanations from an explanation framework, and provides output representations that are used to transform the raw explanations into the natural language explanations.

Figure 2:
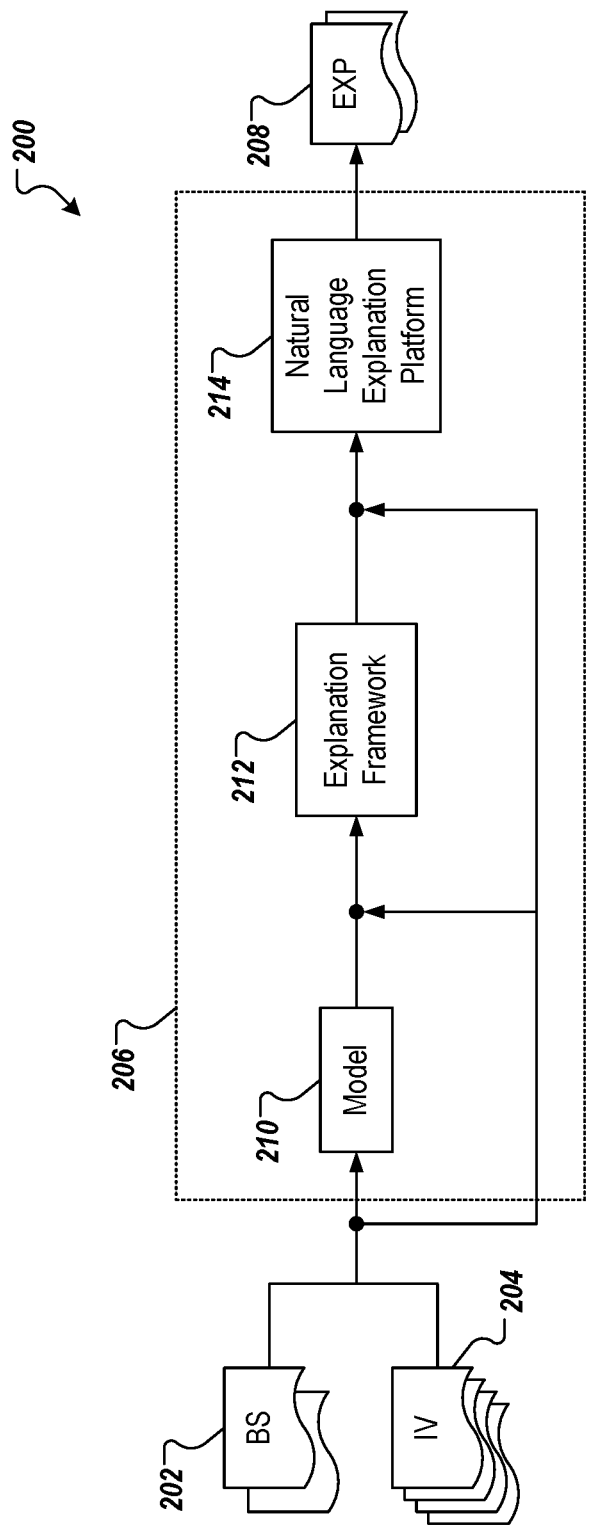
FIG. 2 depicts an example conceptual architecture in accordance with implementations of the present disclosure.

FIG. 2 depicts an example conceptual architecture 200 in accordance with implementations of the present disclosure. In the depicted example, bank statements (BSs) 202 and invoices (IVs) 204 are provided as input to an explanation platform 206, which provides natural language explanations (EXPs) 208. The explanation platform 206 includes a ML model 210, an explanation framework 212, and a natural language explanation platform 214. In some examples, bank statements 202 are matched to invoices 204 by the ML model 210. That is, for example, the ML model 210 matches a bank statement 202 to an invoice 204 and outputs the match as a prediction. In some examples, the prediction includes a score indicating a likelihood that the bank statement 202 matches the invoice 204.

In some implementations, the prediction is provided to the explanation framework 212, which generates a raw explanation that describes one or more reasons underlying the prediction. In some implementations, the natural language platform 214 processes the raw explanation to provide a natural language explanation 208 for the predictions.

In accordance with implementations of the present disclosure, and in the example problem space, the ML-based platform determines matches between a bank statement and an invoice in a set of invoices. In some implementations, the explanation platform provides natural language explanations for predictions (i.e., document matches) of an ML model. In some implementations, input representations are provided and enable qualitative understanding of the relationship between the input (e.g., electronic documents) and the output (e.g., matches). In some implementations, the raw explanations generated by the explanation framework can be used to determine which input representations influenced a particular prediction. In some implementations, output representations are provided and are used to transforms the raw explanations to the natural language explanations.

In further detail, the input representations can be described as a prerequisite for making predictions of ML models explainable. Consequently, implementations of the present disclosure address appropriate design of input representations. In particular, input representations that are interpretable are suitable for explaining predictions. That is, the input representations should make the connections between the input and the output of the ML model clear. The input representations can also be referred to as interpretable features. By way of non-limiting example, in the natural language domain, the input is a document (e.g., a body of text), and an interpretable feature can be a vector. The vector is multi-dimensional, and each dimension represents the presence (or absence) of a particular word. An example of such a vector is referred to as a Bag-of-Words (BOW) representation. The domain of this input representation is $\{0, 1\}^d$, where d is the number of words in the corpus.

In the accounting domain, where the objective is to match bank statement items and invoice items in some finance module, pairs of fields from the documents are considered, which typically come in tabular form. Example pairs of fields can include, without limitation, bank statement amount—invoice amount, bank statement memo line—invoice reference number, and bank statement currency—invoice currency. In some examples, a binary operator is applied to each pair, which provides a feature descriptor. These features are referred to as pairwise features. In the example context, pairwise features are inspired by how human accountants manually match bank statements to invoices (e.g., comparing bank statement amounts to invoice amounts, comparing differences between invoice date and bank statement date, determining whether any invoice reference field is contained in a text field of the bank statement). Intuitively speaking, pairwise features act as a way to model the matching patterns between bank statements and invoices according to what human accountants would normally look for.

FIG. 3A depicts an example table 300 of pairwise features applied on pairs of documents in accordance with implementations of the present disclosure. More particularly, FIG. 3A depicts examples of pairwise features and the columns from the bank statement and invoices tables they are applied to. FIG. 3B depicts an example table 302 of binary operators for pairwise features and respective descriptions. More particularly, FIG. 3B depicts binary operators employed to compute pairwise features.

More formally, given some binary operator $f_i \in F = \{f_1, f_2, \ldots f_n\}$, where F denotes the set of all binary operators and n is the number of pairwise features to generate, some bank statement $b \in B$, and some invoice $i \in I$, the i-th feature of the feature descriptor is calculated as:

$$o_i = f(b, i)$$

The overall feature descriptor for a pair of b and i is derived as:

$$d(b,i) = (o_1, o_2, \ldots, o_n)$$

In other words, a feature descriptor (d) for a bank statement and invoice pair ([b, i]) is defined as a set of pairwise features $(O = o_1, o_2, \ldots, o_n)$.

FIG. 4 depicts an example document matching. More particularly, FIG. 4 depicts an example of applying pairwise features to document pair that includes a bank statement 400 and an invoice 402. In the case shown in FIG. 4, the resulting feature descriptor would be d(b, i)=(1.00, False, True), as discussed in further detail with reference to FIG. 5A. It can be noted that the feature descriptor supports multiple types. Example types include, without limitation, integer, float, and Boolean. The ML model, which consumes these feature descriptors, supports such heterogenetic feature descriptors during its training and inference processes.

FIG. 5A depicts example table 500 of generated pairwise features between documents in accordance with implementations of the present disclosure. More particularly, FIG. 5A provides values of feature descriptors based on matching of the bank statement 400 to the invoice 402 of FIG. 4. In the example of FIG. 5A, a difference value (e.g., feature $o_1$) is provided as the difference between the bank statement amount and the invoice amount (e.g., 1.00), a contains value (e.g., feature $o_2$) is provided as a Boolean (e.g., False) indicating whether the memo line of the bank statement contains the reference identifier of the invoice, and an equals value (e.g., feature $o_3$) is provided as a Boolean (e.g., True) indicating whether a currency of the bank statement and a currency of the invoice are the same.

In accordance with implementations of the present disclosure, the pairwise features (e.g., depicted in FIG. 5A) provide a way to intuitively connect the input (i.e., the bank statement and invoice pair) to the prediction provided by the ML model. Different pairwise features may contribute to the predictions for different instances of pair. For example, the difference (DIFF) feature may be relevant for one pair, while the contains (CONTAINS) feature may yield more significant patterns for another pair. Consequently, implementations of the present disclosure identify which features were important at an instance level. In other words, implementations of the present disclosure determine which features were relevant for a particular prediction (i.e., a particular match).

To achieve this, implementations of the present disclosure use an explanation framework (e.g., the explanation framework 212 of FIG. 2). An example explanation framework includes the Locally-interpretable, Model-agnostic Explanations (LIME) framework. It is contemplated, however, that implementations of the present disclosure can use any appropriate explanation framework to provide raw explanations. The LIME framework is an open source explanation framework that is able to quantify the importance of interpretable features for a particular prediction instance. One feature of the LIME framework is the ability to generate raw explanations without knowing anything about the specifications or parameters of the ML model that generated the prediction. In particular, the LIME framework accepts three inputs: the original input data, the interpretable feature representation of the inputs, and the ML model (also referred to as the target model), and processes these inputs to generate a set of raw explanations.

In some examples, the LIME framework identifies an interpretable model over the interpretable representation that is locally faithful to the underlying classifier (the ML model). In short, the LIME framework makes random perturbations to the input to the ML model to observe how the perturbations affect the predictions. In this manner, the LIME framework is able to see which features contribute more or less to the prediction around a certain locality of the original input. For each feature, the LIME framework provides an importance score, each importance score indicating a relative importance of the respective feature in providing the prediction.

FIG. 5B depicts example generation of pairwise features between documents and respective importance scores in accordance with implementations of the present disclosure. More particularly, FIG. 5B depicts an example table 502 summarizing importance scores assigned by the explanation framework (e.g., the LIME framework) to each pairwise feature. The output of the explanation framework is a list of tuples that include the pairwise features and their respective importance scores. While the scores do not have an absolute scale, the relative importance of each pairwise feature can be ascertained by comparing it to others. In some examples, positive scores indicate that the pairwise feature contributed towards the prediction, while negative scores indicate that the pairwise feature contributed negatively towards the prediction. In some examples, negative scores can indicate why a particular prediction may be inaccurate.

In the example of FIG. 5B, it can be determined that the difference feature contributed to the match more than the equals feature. In this example, this makes sense, because the difference in amount is relatively small, and the same currency (e.g., US dollars) is common. It can also be determined that the contains feature negatively contributed to the predictions, which also makes sense, because the exact reference identifier of the invoice is absent from the memo line of the bank statement.

However, the output of the explanation framework includes tuples of features and numbers, and is not provided in a natural language, user-friendly format. As discussed herein, an important quality of an explanation is to make the connection between the input and the prediction of the ML model intuitive and palpable. As such, even the raw explanations of the explanation framework are not interpretable enough to display to, for example, non-technical end-users (e.g., accountants).

In view of this, the natural language explanation platform of the present disclosure processes the output of the explanation framework to provide explanations in natural language text. In further detail, implementations of the present disclosure provide a table that maps each possible feature to its corresponding natural language explanation. In particular, implementations of the present disclosure provide feature codes, each feature code uniquely representing pairwise features as fingerprints. In some examples, features codes are derived from a prototype, where each operator has a corresponding feature code template and the template parameters would be the columns on which the operator is applied.

FIG. 6A depicts a table 600 of example pairwise feature operators and respective feature codes in accordance with implementations of the present disclosure. FIG. 6B depicts a table 602 of example pairwise feature codes and respective feature codes in accordance with implementations of the present disclosure.

In some implementations, the template parameters in the feature code template are in the brackets { ... }. These are to be filled in with the names of the columns of which the operator is applied. For example, in the example of FIGS. 6A and 6B, for the difference operator (DIFF) the feature code DIFF:AMT_BS:AMT_IV is provided from the feature code template DIFF: {BS_COLUMN}: {IV_COLUMN} by replacing {BS_COLUMN} with AMT_BS and replacing {IV_COLUMN} with AMT_IV.

In some implementations, each feature code is mapped to one or more natural language explanations. In some examples, each natural language explanation is provided as an explanation template having one or more parameters that are to be filled in. In some implementations, each operator is mapped to one or more explanation templates with parameters represented as brackets { ... }. The values that are used to populate the parameters are provided from the data itself. For example, given document $a_i \in B \cup I$, where B and I are the sets of bank statement and invoice items respectively. A parameter $p_j$ is populated with a value:

$$p_j = a_i[c]$$

where [ ] denotes the operation of accessing the value of a at column c.

In the example context, example explanation templates can be provided as:

TABLE 1

Example Explanation Templates

| Feature Code | Condition | Template Explanation |
|---|---|---|
| DIFF:AMT_BS:AMT_IV | $s_1 \geq s_{thr1}$ | The bank statement amount $\{p_1\}$ is very close to the invoice amount $\{p_2\}$. |
| | $s_{thr1} > s_1 \geq s_{thr2}$ | The bank statement amount $\{p_1\}$ is similar to the invoice amount $\{p_2\}$. |
| | $s_1 < s_{thr2}$ | The bank statement amount $\{p_1\}$ is much different than the invoice amount $\{p_2\}$. |
| EQ:CURR_BS:CURR_IV | $s_2 > s_{thr3}$ | The bank statement and the invoice have the same currency, $\{p_3\}$. |
| | $s_2 \leq s_{thr3}$ | The bank statement is in $\{p_3\}$, while the invoice is in $\{p_4\}$. |

In the example of Table 1, $s_1$ and $s_2$ indicate scores assigned to respective feature pairs by the explanation framework (e.g., the importance scores assigned by the LIME framework), and $s_{thr1}$, $s_{thr2}$, $s_{thr3}$ are respective threshold scores used to determine which template explanation is selected for a natural language explanation for a respective feature pair.

Figure 7:
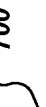
FIG. 7 depicts example natural language explanations generated using feature codes in accordance with implementations of the present disclosure.

FIG. 7 depicts example natural language explanations generated using feature codes in accordance with implementations of the present disclosure. More particularly, FIG. 7 demonstrates a table 700 of example natural language explanations derived from feature codes and the corresponding values from the bank statement and the invoice that were matched by an ML model. While each natural language explanation is handcrafted from feature code, they are crucial in providing end-users with intuitive and clear reasons for why a machine learning model predicted match between a bank statement and invoice.

Figure 8:
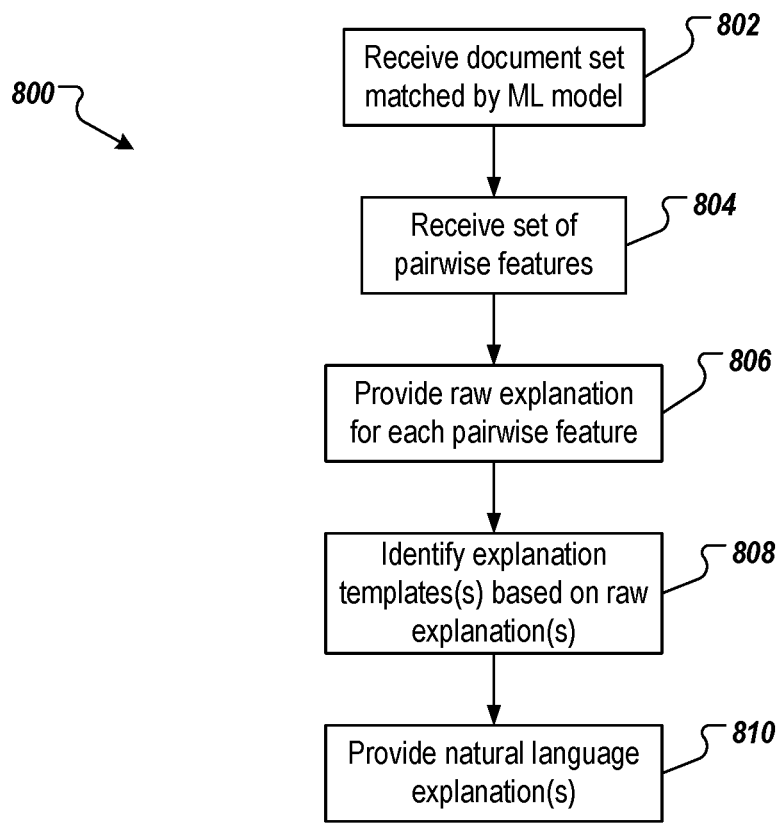
FIG. 8 depicts an example process that can be executed in accordance with implementations of the present disclosure.

FIG. 8 depicts an example process 800 that can be executed in accordance with implementations of the present disclosure. In some examples, the example process 800 is provided using one or more computer-executable programs executed by one or more computing devices.

A set of documents matched by an ML model is received (802). For example, and with reference to FIG. 2, the bank statements (BSs) 202 and the invoices (IVs) 204 are provided as input to the ML model 210, which matches a bank statement 202 to an invoice 204 and outputs the match as the set of documents (e.g., match predicted by the ML model 210). A set of pairwise features is received (804). For example, and with reference to FIG. 500, a set of pairwise features is provided from the document with each pairwise feature including a feature of the bank statement and a feature of the invoice. A raw explanation is provided for each pairwise feature (806). For example, and as described herein, an explanation framework (e.g., the LIME framework) randomly perturbates input to the ML model to affect predictions of the ML model and generate an importance score for each pairwise feature.

One or more explanation templates are identified based on the raw explanations (808). For example, and as described herein, a feature code is determined for each pairwise feature, and the feature code is used to identify a set of natural language explanation templates (e.g., as depicted in Table 1, above). The importance score is used to select a natural language explanation template from the set of natural language templates. For example, and with reference to Table 1, if the feature code DIFF:AMT_BS:AMT_IV is provided, the set of natural language explanation templates [The bank statement amount $\{p_1\}$ is very close to the invoice amount $\{p_2\}$; The bank statement amount $\{p_1\}$ is similar to the invoice amount $\{p_2\}$; The bank statement amount $\{p_1\}$ is much different than the invoice amount $\{p_2\}$] is provided, and, if the importance score Si is less than $s_{thr2}$ (e.g., 0), the natural language explanation template [The bank statement amount $\{p_1\}$ is much different than the invoice amount $\{p_2\}$] is selected. One or more natural explanations are provided (810). For example, values of one or more parameters of the selected natural language explanation template are determined from the documents, and are used to populate the natural language explanation template to provide a natural language explanation.

Figure 9:
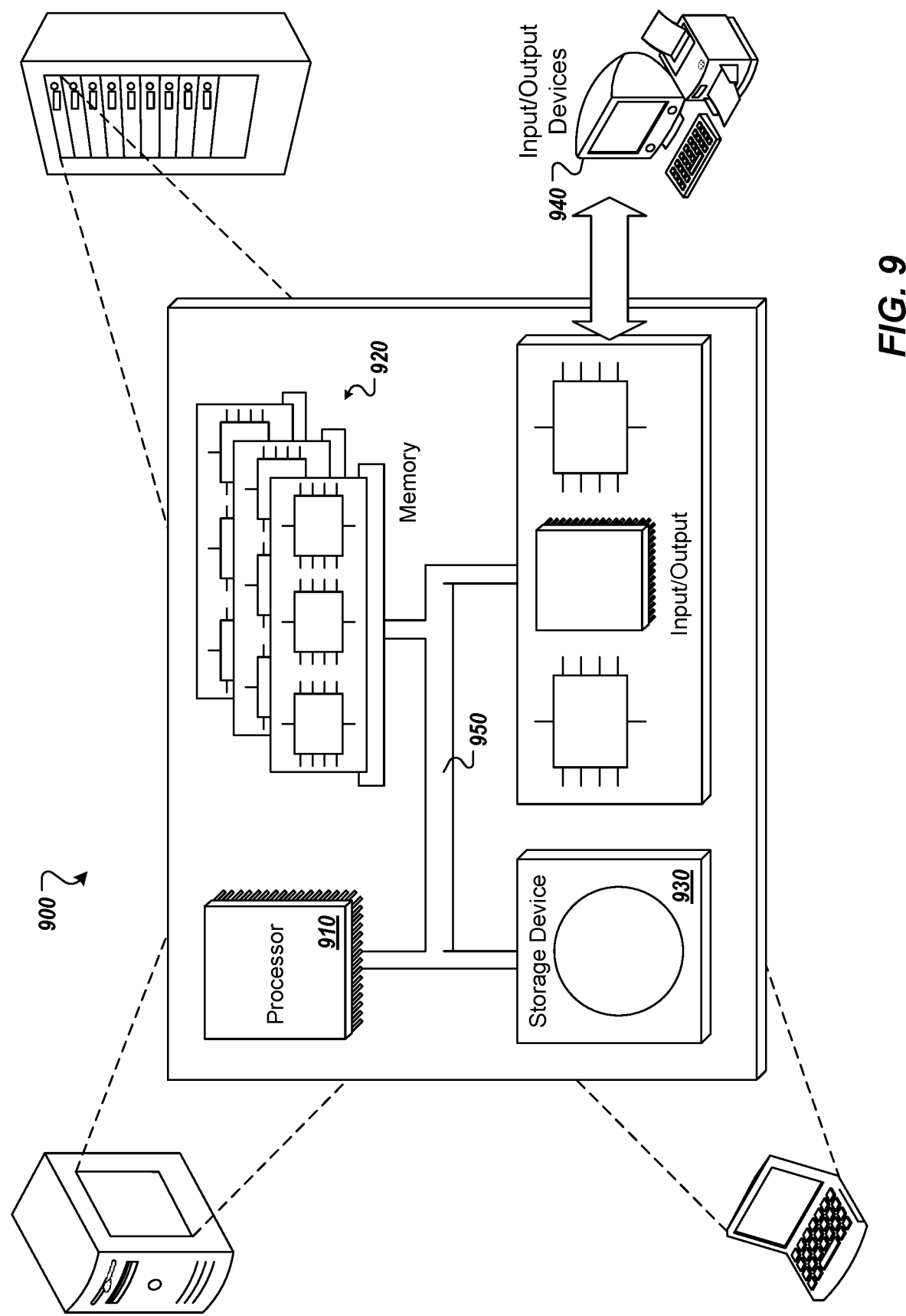
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, 940 are interconnected using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. In some implementations, the memory 920 is a volatile memory unit. In some implementations, the memory 920 is a non-volatile memory unit. The storage device 930 is capable of providing mass storage for the system 900. In some implementations, the storage device 930 is a computer-readable medium. In some implementations, the storage device 930 may be a floppy disk device, a hard disk device, an optical disk device, or a tape device. The input/output device 940 provides input/output operations for the system 900. In some implementations, the input/output device 940 includes a keyboard and/or pointing device. In some implementations, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing natural language explanations for document matches of machine learning (ML) models, the method being executed by one or more processors and comprising:
    receiving a set of documents matched by a ML model, each document in the set of documents comprising a computer-readable electronic document;
    processing a set of pairwise features, the ML model, and the set of documents by an explanation framework to generate a set of raw explanations, the set of raw explanations comprising one or more raw explanations, each raw explanation comprising a pairwise feature and an importance score;
    for each raw explanation, identifying a natural language template based on the pairwise feature and the importance score; and
    populating the natural language template with one or more parameters provided from the set of documents to provide a natural language explanation for matching of the documents in the set of documents by the ML model.

2. The method of claim 1, wherein identifying a natural language template based on the pairwise feature and the importance score comprises:
    determining a set of natural language templates based on the pairwise feature; and
    selecting the natural language template from the set of natural language templates based on the importance score.

3. The method of claim 2, wherein determining a set of natural language templates based on the pairwise feature comprises identifying a feature code for the pairwise feature, and identifying the set of natural language templates based on the feature code.

4. The method of claim 1, further comprising determining a feature descriptor for the set of documents, the feature descriptor comprising a set of pairwise features provided by processing features based on binary operators.

5. The method of claim 1, wherein each parameter comprises a value determined from a document in the set of documents.

6. The method of claim 1, wherein the explanation framework randomly perturbates input to the ML model to affect predictions of the ML model and generate an importance score for each pairwise feature.

7. The method of claim 1, wherein the set of documents comprise a bank statement and an invoice.

8. A non-transitory computer-readable storage medium coupled to one or more processors and having instructions stored thereon which, when executed by the one or more processors, cause the one or more processors to perform operations for natural language explanations for document matches of machine learning (ML) models, the operations comprising:
    receiving a set of documents matched by a ML model, each document in the set of documents comprising a computer-readable electronic document;
    processing a set of pairwise features, the ML model, and the set of documents by an explanation framework to generate a set of raw explanations, the set of raw explanations comprising one or more raw explanations, each raw explanation comprising a pairwise feature and an importance score;
    for each raw explanation, identifying a natural language template based on the pairwise feature and the importance score; and
    populating the natural language template with one or more parameters provided from the set of documents to provide a natural language explanation for matching of the documents in the set of documents by the ML model.

9. The computer-readable storage medium of claim 8, wherein identifying a natural language template based on the pairwise feature and the importance score comprises:
    determining a set of natural language templates based on the pairwise feature; and
    selecting the natural language template from the set of natural language templates based on the importance score.

10. The computer-readable storage medium of claim 9, wherein determining a set of natural language templates based on the pairwise feature comprises identifying a feature code for the pairwise feature, and identifying the set of natural language templates based on the feature code.

11. The computer-readable storage medium of claim 8, wherein operations further comprise determining a feature descriptor for the set of documents, the feature descriptor comprising a set of pairwise features provided by processing features based on binary operators.

12. The computer-readable storage medium of claim 8, wherein each parameter comprises a value determined from a document in the set of documents.

13. The computer-readable storage medium of claim 8, wherein the explanation framework randomly perturbates input to the ML model to affect predictions of the ML model and generate an importance score for each pairwise feature.

14. The computer-readable storage medium of claim 8, wherein the set of documents comprise a bank statement and an invoice.

15. A system, comprising:
    a computing device; and
    a computer-readable storage device coupled to the computing device and having instructions stored thereon which, when executed by the computing device, cause the computing device to perform operations for natural language explanations for document matches of machine learning (ML) models, the operations comprising:

receiving a set of documents matched by a ML model, each document in the set of documents comprising a computer-readable electronic document;

processing a set of pairwise features, the ML model, and the set of documents by an explanation framework to generate a set of raw explanations, the set of raw explanations comprising one or more raw explanations, each raw explanation comprising a pairwise feature and an importance score;

for each raw explanation, identifying a natural language template based on the pairwise feature and the importance score; and populating the natural language template with one or more parameters provided from the set of documents to provide a natural language explanation for matching of the documents in the set of documents by the ML model.

16. The system of claim 15, wherein identifying a natural language template based on the pairwise feature and the importance score comprises:

determining a set of natural language templates based on the pairwise feature; and selecting the natural language template from the set of natural language templates based on the importance score.

17. The system of claim 16, wherein determining a set of natural language templates based on the pairwise feature comprises identifying a feature code for the pairwise feature, and identifying the set of natural language templates based on the feature code.

18. The system of claim 15, wherein operations further comprise determining a feature descriptor for the set of documents, the feature descriptor comprising a set of pairwise features provided by processing features based on binary operators.

19. The system of claim 15, wherein each parameter comprises a value determined from a document in the set of documents.

20. The system of claim 15, wherein the explanation framework randomly perturbates input to the ML model to affect predictions of the ML model and generate an importance score for each pairwise feature.

* * * * *